United States Patent
Little

(10) Patent No.: US 9,866,455 B2
(45) Date of Patent: Jan. 9, 2018

(54) USING STATUS INQUIRY AND STATUS RESPONSE MESSAGES TO EXCHANGE MANAGEMENT INFORMATION

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 132 days.

(21) Appl. No.: 14/477,784

(22) Filed: Sep. 4, 2014

(65) Prior Publication Data

US 2014/0379834 A1   Dec. 25, 2014

Related U.S. Application Data

(62) Division of application No. 11/998,717, filed on Nov. 30, 2007, now Pat. No. 8,832,255.

(51) Int. Cl.
| | |
|---|---|
| *G06F 15/173* | (2006.01) |
| *H04L 12/26* | (2006.01) |
| *H04L 12/24* | (2006.01) |
| *H04L 29/08* | (2006.01) |

(52) U.S. Cl.
CPC .......... *H04L 43/04* (2013.01); *H04L 41/0246* (2013.01); *H04L 43/0817* (2013.01); *H04L 43/10* (2013.01); *H04L 67/10* (2013.01); *H04L 67/22* (2013.01)

(58) Field of Classification Search
CPC ............. H04L 41/0246; H04L 41/0803; H04L 41/082; H04L 67/22; H04L 43/10; H04L 41/00; H04L 43/04; H04L 43/0817; H04L 67/10; G06F 11/3013
USPC ........ 709/224, 206, 212, 223; 370/242, 419, 370/389, 328, 254
See application file for complete search history.

(56) References Cited

U.S. PATENT DOCUMENTS

| | | |
|---|---|---|
| 5,953,532 A | 9/1999 | Lochbaum |
| 6,151,608 A | 11/2000 | Abrams |
| 6,226,792 B1 | 5/2001 | Goiffon et al. |
| 6,256,675 B1 | 7/2001 | Rabinovich |
| 6,622,259 B1 | 9/2003 | Schmuck |
| 6,810,259 B1 | 10/2004 | Zhang |
| 7,065,637 B1 | 6/2006 | Nanja |
| 7,080,078 B1 | 7/2006 | Slaughter et al. |
| 7,124,320 B1 | 10/2006 | Wipfel |
| 7,159,224 B2 | 1/2007 | Sharma et al. |
| 7,185,342 B1 | 2/2007 | Carrer et al. |
| 7,403,972 B1 * | 7/2008 | Lau ..................... G06F 11/3013 709/206 |
| 7,464,147 B1 | 12/2008 | Fakhouri et al. |

(Continued)

OTHER PUBLICATIONS

Franz Huber et al., "Tool Supported Specification and Simulation of Distributed Systems," Institut fur Informatik, Technische Universitat Munchen, 1998, 10 pages, Munchen.

(Continued)

*Primary Examiner* — Jungwon Chang
(74) *Attorney, Agent, or Firm* — Lowenstein Sandler LLP

(57) ABSTRACT

A status inquiry message is generated at a first machine, wherein the status inquiry message is directed to one of a second machine or a service operating on the second machine. A status inquiry message is transmitted to the second machine. The first machine receives a status response message; the status response message indicating management information from the second machine.

14 Claims, 6 Drawing Sheets

(56) References Cited

U.S. PATENT DOCUMENTS

| | | | |
|---|---|---|---|
| 7,627,671 B1 | 12/2009 | Palma et al. | |
| 7,730,172 B1 | 6/2010 | Lewis | |
| 7,912,945 B2 | 3/2011 | Little | |
| 8,160,913 B2 | 4/2012 | Simons et al. | |
| 8,209,272 B2 | 6/2012 | Little | |
| 8,392,509 B1* | 3/2013 | Klessig | H04L 41/0803 370/419 |
| 8,464,270 B2 | 6/2013 | Little | |
| 8,645,837 B2 | 2/2014 | Little | |
| 8,832,255 B2* | 9/2014 | Little | H04L 41/0246 370/242 |
| 2002/0007468 A1 | 1/2002 | Kampe et al. | |
| 2002/0052884 A1 | 5/2002 | Farber et al. | |
| 2002/0091746 A1 | 7/2002 | Umberger et al. | |
| 2002/0107949 A1 | 8/2002 | Rawson | |
| 2002/0129346 A1 | 9/2002 | Lee et al. | |
| 2002/0156893 A1 | 10/2002 | Pouyoul et al. | |
| 2002/0178254 A1 | 11/2002 | Brittenham et al. | |
| 2003/0009545 A1 | 1/2003 | Sahai et al. | |
| 2003/0018780 A1 | 1/2003 | Kawashima | |
| 2003/0043846 A1 | 3/2003 | Purpura et al. | |
| 2003/0046615 A1 | 3/2003 | Stone | |
| 2003/0115273 A1 | 6/2003 | Delia et al. | |
| 2003/0182427 A1 | 9/2003 | Halpern | |
| 2003/0184595 A1 | 10/2003 | Kodosky et al. | |
| 2003/0192028 A1 | 10/2003 | Gusler et al. | |
| 2004/0006638 A1 | 1/2004 | Oberlander et al. | |
| 2004/0008373 A1 | 1/2004 | Yamamoto | |
| 2004/0064543 A1 | 4/2004 | Ashutosh et al. | |
| 2004/0064548 A1 | 4/2004 | Adams et al. | |
| 2004/0068637 A1 | 4/2004 | Nelson et al. | |
| 2004/0133611 A1 | 7/2004 | Cabrera et al. | |
| 2004/0143830 A1 | 7/2004 | Gupton et al. | |
| 2004/0148185 A1 | 7/2004 | Sadiq | |
| 2004/0255291 A1 | 12/2004 | Sierer et al. | |
| 2005/0010919 A1 | 1/2005 | Ramanathan et al. | |
| 2005/0071470 A1 | 3/2005 | O'Brien et al. | |
| 2005/0119905 A1 | 6/2005 | Wong et al. | |
| 2005/0120092 A1 | 6/2005 | Nakano et al. | |
| 2005/0172306 A1 | 8/2005 | Agarwal et al. | |
| 2005/0198450 A1 | 9/2005 | Corrado et al. | |
| 2005/0235248 A1 | 10/2005 | Victoria et al. | |
| 2005/0271004 A1* | 12/2005 | Cho | H04L 12/581 370/328 |
| 2006/0005162 A1 | 1/2006 | Tseng et al. | |
| 2006/0106590 A1 | 5/2006 | Tseng et al. | |
| 2006/0190527 A1 | 8/2006 | Neil et al. | |
| 2006/0218266 A1 | 9/2006 | Matsumoto et al. | |
| 2006/0218272 A1 | 9/2006 | Murakami | |
| 2006/0227725 A1* | 10/2006 | Huotari | H04L 41/082 370/254 |
| 2006/0242292 A1 | 10/2006 | Carter | |
| 2007/0016674 A1 | 1/2007 | Shinohara et al. | |
| 2007/0067355 A1 | 3/2007 | Mori et al. | |
| 2007/0180436 A1 | 8/2007 | Travostino et al. | |
| 2007/0233671 A1 | 10/2007 | Oztekin et al. | |
| 2007/0240143 A1 | 10/2007 | Guminy et al. | |
| 2007/0271348 A1 | 11/2007 | Yang | |
| 2007/0294577 A1 | 12/2007 | Fiske | |
| 2008/0005321 A1 | 1/2008 | Ma et al. | |
| 2008/0045267 A1 | 2/2008 | Hind et al. | |
| 2008/0052384 A1 | 2/2008 | Marl et al. | |
| 2008/0059746 A1 | 3/2008 | Fisher | |
| 2008/0071748 A1 | 3/2008 | Wroblewski et al. | |
| 2008/0141170 A1 | 6/2008 | Kodosky et al. | |
| 2008/0205394 A1 | 8/2008 | Deshpande et al. | |
| 2008/0263559 A1 | 10/2008 | Das et al. | |
| 2008/0300851 A1 | 12/2008 | Chakrabarti et al. | |
| 2009/0022151 A1* | 1/2009 | Jeon | H04L 67/125 370/389 |
| 2009/0037573 A1 | 2/2009 | Qiu et al. | |
| 2009/0141635 A1 | 6/2009 | Little | |
| 2009/0144355 A1 | 6/2009 | Little | |
| 2010/0058448 A1 | 3/2010 | Courtay et al. | |
| 2010/0146396 A1 | 6/2010 | Able et al. | |
| 2013/0275487 A1 | 10/2013 | Little | |

OTHER PUBLICATIONS

"JBossESB Requirments and Architecture, Version: 0.3," May 2, 2006, 12 pages.

King, Erik, "Perpetual Enterprise Management Service (PEMS) for Next Generation SOA-based Command & Control Systems", Jun. 2005, 49 pages.

"Why ESB and SOA?" Version 0.3, Date: Jan. 27, 2006, 7 pages.

OASIS, "Web Services Context Specification (WS-Context)," OASIS Committee draft version 0.8, Version created Nov. 3, 2004, Editors, Mark Little, et al., Copyright 2004 The Organization for the Advancement of Structured Information Standards [Appendix A], pp. 1-23.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-0sxml.html, Mar. 14, 2007, pp. 1-13.

Hewlett-Packard Development Company, L.P., "HP Network Node Manager Advanced Edition 7.53 Data sheet", Jun. 2008, 7 pages.

USPTO Non-Final Office Action dated May 11, 2011 for. U.S. Appl. No. 11/998,702.

USPTO Final Office Action dated Sep. 27, 2011 for U.S. Appl. No. 11/998,702.

USPTO Non-Final Office dated Sep. 20, 2012 Action for U.S. Appl. No. 11/998,702.

USPTO Notice of Allowance dated Feb. 11, 2013 for U.S. Appl. No. 11/998,702.

USPTO Non-Final Office Action dated Jan. 3, 2014 for U.S. Appl. No. 13/913,107.

USPTO Final Office Action dated Jul. 22, 2014 for U.S. Appl. No. 13/913,107.

USPTO Non-Final Office Action dated Oct. 15, 2010 for U.S. Appl. No. 11/998,717.

USPTO Non-Final Office Action dated Apr. 4, 2011 for U.S. Appl. No. 11/998,717.

USPTO Final Office Action dated Oct. 5, 2011 for U.S. Appl. No. 11/998,717.

USPTO Non-Final Office Action dated Nov. 18, 2013 for U.S. Appl. No. 11/998,717.

USPTO Notice of Allowance dated May 7, 2014 for U.S. Appl. No. 11/998,717.

USPTO Non-Final Office Action dated Feb. 17, 2010 for U.S. Appl. No. 11/998,561.

USPTO Final Office Action dated Aug. 3, 2010 for U.S. Appl. No. 11/998,561.

USPTO Notice of Allowance dated Nov. 12, 2010 for U.S. Appl. No. 11/998,561.

USPTO Non-Final Office Action dated Sep. 13, 2011 for U.S. Appl. No. 12/324,774.

USPTO Final Office Action dated Feb. 16, 2012 for U.S. Appl. No. 12/324,774.

USPTO Notice of Allowance dated Sep. 27, 2013 for U.S. Appl. No. 12/324,774.

USPTO Non-Final Office Action dated Oct. 20, 2011 for U.S. Appl. No. 12/395,459.

USPTO Notice of Allowance dated Feb. 28, 2012 for U.S. Appl. No. 12/395,459.

USPTO Non-Final Office Action dated Feb. 11, 2016 for U.S. Appl. No. 14/475,331.

USPTO Final Office Action dated Aug. 17, 2016 for U.S. Appl. No. 14/475,331.

USPTO Non-Final Office Action dated Jun. 22, 2017 for U.S. Appl. No. 14/475,331.

* cited by examiner

USING STATUS INQUIRY AND STATUS RESPONSE MESSAGES TO EXCHANGE MANAGEMENT INFORMATION

RELATED APPLICATIONS

This application is a divisional application of U.S. patent application Ser. No. 11/998,717 filed Nov. 30, 2007, the entire contents of which are hereby incorporated by reference.

TECHNICAL FIELD

Embodiments of the present invention relate to distributed systems, and more specifically to exchanging management information via status inquiry and status response messages in a distributed computing system.

BACKGROUND

Distributed computing systems include multiple services and/or applications that operate on different machines (computing devices) that are connected via a network. Some services or applications may rely on other services and/or applications to operate. However, machines, and services and applications that operate on the machines, may occasionally become unavailable (e.g., when a machine loses power, an application crashes, a network connection to the machine is lost, etc.).

In some distributed computing systems, to determine which machines, services and applications are operative at a given time, each machine in the distributed computing system can periodically transmit status inquiry messages, which are typically referred to as "are-you-alive messages" or "heartbeat messages." The status inquiry message is a small control message that is generated and sent between machines or services on machines (services may fail independently of machines, so simply detecting that the machine is alive may not be sufficient). A queried machine that receives the status inquiry message generates a status response message. The status response message is then sent back to the original querying machine that sent the status inquiry message. The querying machine can then receive the status response message, which provides confirmation that the queried machine and/or service is still active. Such status inquiry and status response messages may be continuously transmitted between machines within a distributed computing system at a specified frequency.

Each machine within a distributed computing system typically includes a management application that monitors the activities of other applications, services and machines in the distributed computing system. The management applications generate and exchange management messages that typically include management information about services that are available within the distributed computing system, such as how long a service has been active, how many users a service has had, the present and past workload of the service, software versions of the service, etc., and about the machines on which the services operate, such as a number of services that operate on the machine, capabilities of the machine, etc. The management messages exchanged by the management applications are separate and distinct from the status inquiry and status response messages that are transmitted between machines. Each of the status inquiry messages, status response messages, and management messages consume bandwidth of the distributed computing system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
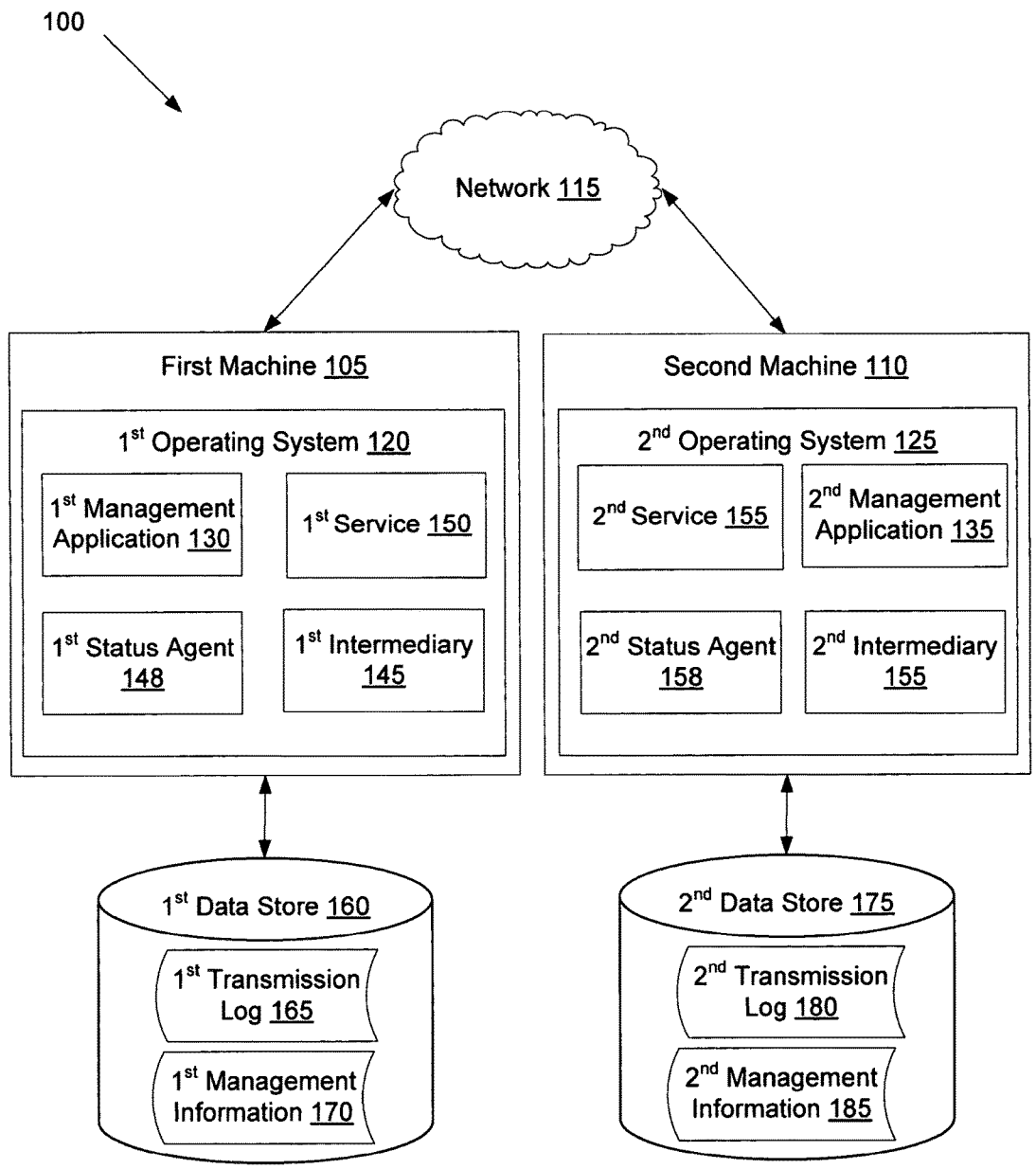
FIG. 1 illustrates an exemplary distributed computing system, in which embodiments of the present invention may operate.

Described herein is a method and apparatus for exchanging management information between machines in a distributed computing system. In one embodiment, a status inquiry message is received at a first machine via a network. The status inquiry message may be directed to the first machine, or to a service that operates on the first machine. The status inquiry message may include management information of a second machine from which the status inquiry message originated. If the status inquiry message includes such management information, the management information may be cached, and may be forwarded to a management application at the first machine. A status response message that indicates that the first machine and/or the service is operational is generated at the first machine. Management information that includes operating statistics of the first machine, the service and/or an additional service that operates on the first machine is attached to the status response message. Management information may include, for example, how long a service has been active, how many users a service has had, the present and past workload of the service, software versions of the service, how long a machine has been active, services operating on a machine, and so on. The status response message is then transmitted to the second machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "determining", "attaching", "transmitting", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 includes multiple machines (e.g., first machine 105 and second machine 110) connected via a network 115. The network 115 may be a public network (e.g., Internet), a private network (e.g., Ethernet or a local area Network (LAN)), or a combination thereof. In one embodiment, the network 115 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate a SOA. In one embodiment, the ESB is a single bus that logically interconnects all available services and clients. Alternatively, the ESB may include multiple buses, each of which may logically interconnect different services and/or clients.

Machines (e.g., first machine 105 and second machine 110) may be desktop computers, laptop computers, servers, etc. In one embodiment, first machine 105 is connected with a first data store 160, and second machine 110 is connected with a second data store 175. First data store 160 and second data store 175 may be hard disk drives, optical drives, solid state memory, and/or tape backup drives. First data store 160 and second data store 175 may be internal to the first machine 105 and second machine 110, respectively. Alternatively, first data store 160 and second data store 175 may be external to the first machine 105 and second machine 110. Data stores 160, 175 may be used to store transmission logs, management information, or other data, as discussed in greater detail below.

Each of the machines 105, 110 includes an operating system (e.g., first operating system 120 and second operating system 125) that manages an allocation of resources of the machine (e.g., by allocating memory, prioritizing system requests, controlling input and output devices, managing file systems, facilitating networking, etc.). Examples of operating systems that may be included in machines 105, 110 include Linux, Unix, Windows®, OS X®, etc. Different machines may include different operating systems, and/or multiple machines may each include the same operating system. For example, first machine 105 and second machine 110 may each include Linux, or first machine 105 may include Linux and second machine 110 may include Unix.

To facilitate networking, each operating system 102, 125 may include a status agent (e.g., first status agent 148 and second status agent 158) that can transmit, receive and respond to status inquiry messages. Status inquiry messages are used to determine whether remote machines, services and applications are operative at a given time. Upon receipt of a status inquiry message, a status agent (e.g., of a queried machine) generates a status response message, and transmits the status response message back to a sender of the status inquiry message. The status response message notifies the sender of the status inquiry message that the queried machine or service is active.

In one embodiment, the first status agent 148 is integrated into the first operating system 120, and second status agent 158 is integrated into second operating system 125. The integrated first status agent 148 and second status agent 158 may use internet control message protocol (ICMP) messages as the status inquiry and status response messages. For example, the first status agent 148 and second status agent 158 may use an echo request and/or echo response message to determine the operating status of a remote machine. ICMP is a core protocol of the internet protocol suite, and provides a means for operating systems 120, 125 to exchange low level error messages and informational messages. ICMP messages are created at a network level (e.g., of the five layer TCP/IP model), and are encapsulated within an internet protocol (IP) datagram.

In another embodiment, the first status agent 148 is a distinguished service on the first machine 105, and the second status agent 158 is a distinguished service on the second machine 110. Each status agent can be tied to the operating system on which it resides such that if the operating system crashes and recovers, the status agent will always be made active (e.g., boot up). The status agents may be located at well known addresses on the distributed computing system 100, and may respond to status inquiry messages on behalf of the machines on which they reside. If, for example, first service 150 (or first machine 105) wants to know if second machine 110 is alive, it can ping second status agent 158 (e.g., sends a status inquiry message to second status agent 158). If able, second status agent 158 would then respond with a status response message.

Status inquiry messages and status response messages each have a size on the order of magnitude of approximately 100 bytes. However, for networks that are implemented using Ethernet, there is a minimum of approximately 1400 bytes (1040 bytes of data plus a 360 byte header) of bandwidth that is consumed for the transmission of a message, irregardless of that message's size. Therefore, even if the status inquiry message and status response messages have a size of only 64 bytes, they still consume about 1400 bytes of bandwidth in transmission. Accordingly, additional information can be attached to the status inquiry and status response messages without consuming additional bandwidth on the network 115. So long as the message and attachment, in combination, do not have a size larger than approximately 1400 bytes (or 1040 bytes if no header is considered), no additional bandwidth is consumed during message transmission.

Each of the operating systems may include clients (e.g., client 138), services (e.g., first service 150 and second service 155), management applications (e.g., first management application 130 and second management application 135), and intermediaries (e.g., first intermediary 145 and second intermediary 255). Clients may be applications that run on a machine, and that access services. Services 150, 155 are discretely defined sets of contiguous and autonomous functionality (e.g., business functionality, technical functionality, etc.) that operate on a machine or machines. Each service 250, 255 may represent a process, activity or other resource that can be accessed and used by other services or clients on network 115. Each service 150, 155 may be independent of other services, and may be accessed without knowledge of its underlying platform implementation.

In an example for a business function of "managing orders," services 150, 155 may include, for example, create order, fulfill order, ship order, invoice order, cancel/update order, etc. Each such service 150, 155 may be autonomous from the other services that are used to manage orders, and may be remote from one another and have different platform implementations. However, the services may be combined and used by one or more applications to manage orders.

Management applications 130, 135 monitor the activities of other applications, services and machines in the distributed computing system. Each management application 130, 135 may gather operating statistics of applications and/or services to which the management application is connected (e.g., those applications and services that operate on a machine on which the management application operates). For example, first management application 130 may collect operating statistics of client 138, first service 150 and first machine 105, and second management application 135 may collect operating statistics on second service 155 and second machine 110. Management applications 130, 135 may collect data on, for example, how long a service has been active, how many clients have used a service, the current and past workload of a service, software versions being used by an application or service, etc. Management applications 130, 135 may also gather operating statistics of the machine on which the management application operates (e.g., how long the machine has been active, number of services operating on the machine, machine capabilities, etc.). Collected management information (e.g., first management information 170 and second management information 185) can then be stored in a data store (e.g., first data store 160 and second data store 175).

Management applications 130, 135 exchange collected management information with other management applications. For example, in one embodiment first management application 130 transmits first management information 170 (including operating statistics on first service 150, client 138 and/or first machine 105) to second management application 135, and receives second management information 185 (including operating statistics on second service 155 and/or second machine 110) from second management application 135. Management applications 130, 135 may generate management messages that query other management applications about specific services and/or clients operating on other machines. Alternatively, management applications may send general queries that request all available management information pertaining to a queried machine.

In one embodiment, the exchange of management information is performed by intermediaries (e.g., first intermediary 145 and second intermediary 155). In one embodiment, intermediaries 140, 145 are low level services that operate below the application level (e.g. at the network layer of the five layer TCP/1P model). For example, first intermediary 145 may be a function of first operating system 120, and second intermediary may be a function of second operating system 125. In another embodiment, intermediaries 140, 145 are distinct services that operate at the application (or service) level. Each intermediary 140, 145 may be connected with a management application 130, 135 and a status agent 148, 158. The intermediary 140, 145 can thereby receive management information from, and forward management information to, the attached management application 130, 135. The intermediary can also attach management information to, and retrieve management information from, status inquiry and status response message through its connection to the status agent.

Intermediaries 140, 145 can exchange management information by attaching it to status inquiry messages and status response messages. For example, when second status agent 158 receives a status inquiry message from first machine 105 (e.g., from first operating system 120 or first status agent 148), second status agent 158 generates a status response message. Second intermediary 155 may then attach second management information 185 to the status response message. When first status agent 148 (or first operating system 120) receives the status response message, first intermediary 145 can then remove the second management information 185 from the status response message, and forward it to first management application 130 and/or store it in first data store 160. So long as the attachment and the status response message do not have a combined size that is greater than approximately 1400 bytes (in a network that uses Ethernet), the management information is exchanged without consuming any additional bandwidth. However, even if greater bandwidth is consumed in the transmission of the status response message, such a transmission can still be more efficient than sending a separate management message to transmit the second management information 185 (e.g. due to reduced overhead that is introduced by reducing a number of transmissions sent over network 115).

Intermediaries 140, 145 may detect incoming and outgoing status inquiry messages and status response messages, for example, by monitoring all incoming and outgoing messages. Alternatively, intermediaries 140, 145 may detect status inquiry and status response messages by monitoring activity at specific ports (e.g., ports that are reserved for status inquiry and status response messages). Other detection techniques may also be used.

In one embodiment, intermediaries 140, 145 determine whether a machine that is to receive a status inquiry message or a status response message is equipped to receive management information via the status inquiry and/or status response message. Such a determination may be made by examining a table that identifies for each machine in a distributed computing system whether or not the machine is equipped to receive management information via status inquiry and/or status response messages. The table (not shown) may be stored in a data store (e.g., first data store 160 or second data store 175). Alternatively, such a determination may be made by examining the status inquiry or status response message. Status inquiry and status response messages may include a tag that identifies whether they were generated by a machine that can receive management information via status response messages. Such a tag may be placed by an intermediary on the status inquiry message or status response message even when no management information is attached to the message, thereby providing notification that a machine is equipped to receive management information vie status inquiry and status response messages.

Management applications 130, 135 may generate management messages that include queries about specific management information, and send such management messages to queried machines. In one embodiment, an intermediary 140, 145 may intercept such a management message, and attach the query included in the management message to a next status inquiry message. An intermediary may intercept a management message by monitoring a management application to which the intermediary may be connected. Alternatively, the intermediary may monitor a specific port or ports used by the management application and/or analyze outgoing messages to determine if they are management messages. An intermediary 140, 145 resident on the queried machine may then gather the requested management information (e.g., by requesting it from a management application), and attach it to a status response message that is transmitted in response to the status inquiry message. Specific management information may therefore be exchanged at the request of management applications via status inquiry and status response messages.

In some instances, there may be more management information available than is attached to a status inquiry or status response message. This may occur, for example, if the management information in combination with a status response message would be larger than approximately 1400 bytes. In one embodiment, management information is divided into multiple portions. For example, management information may be divided into multiple portions that are each smaller than approximately 1000 bytes. Each portion may be attached to a separate status inquiry or status response message until all the portions have been transmitted. To monitor what management information has been transmitted, in one embodiment intermediaries 140145 maintain a transmission log in a data store (e.g., first transmission log 165 and second transmission log 180) that identifies management information that has previously been sent to remote machines. Therefore, an intermediary 140, 145 may determine what management information has not yet been transmitted, and attach that management information to a status response or status inquiry message. In a further embodiment, current management information can be compared to the transmission log to determine whether the management information has changed since a last transmission. An intermediary 140, 145 may attach only changed management information to a subsequent status response or status inquiry message. Alternatively, if the management information will not increase a bandwidth necessary to transmit a status response or status inquiry message, the management information may be added to the message even if the management information has not changed. This may be useful, for example, in case originally transmitted management information was corrupted, or if it was never received.

Figure 2:
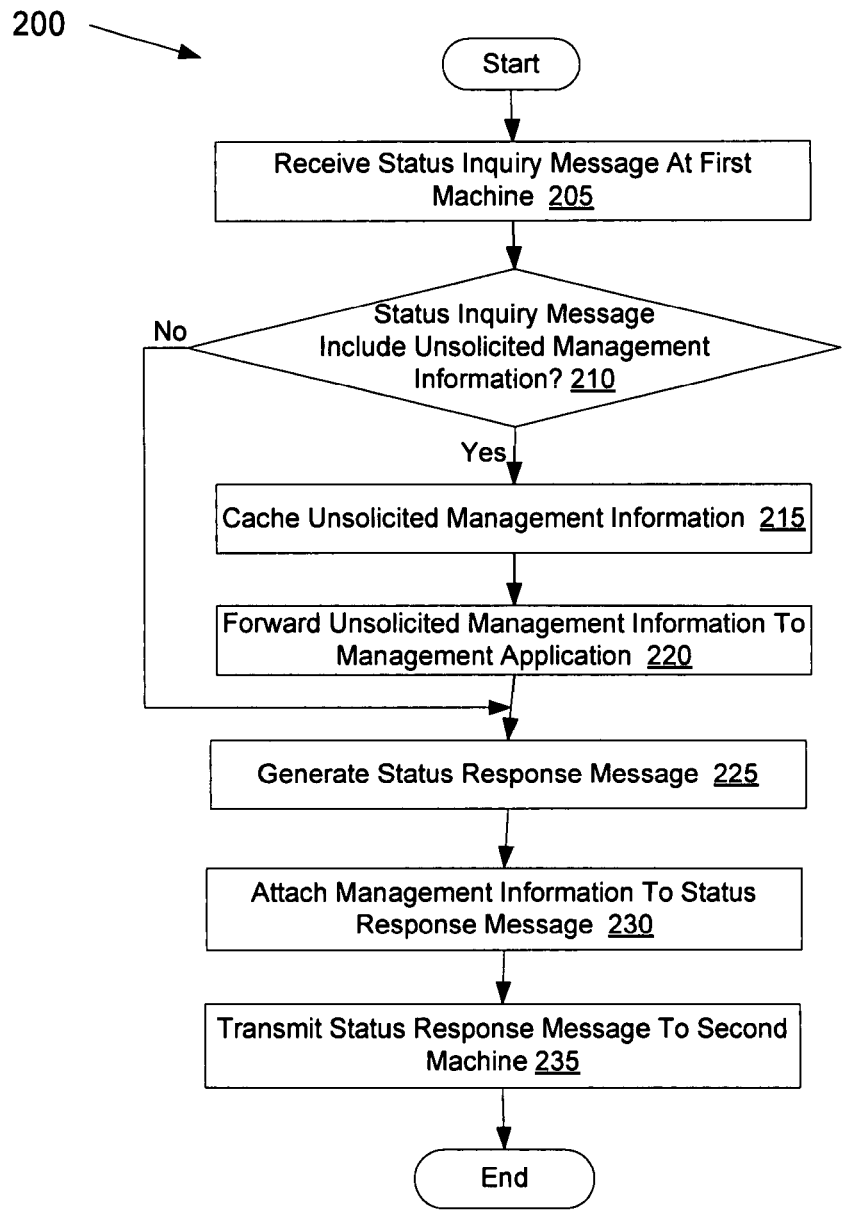
FIG. 2 illustrates a flow diagram of one embodiment for a method of attaching management information to status response messages in a distributed computing system.

FIG. 2 illustrates a flow diagram of one embodiment for a method 200 of attaching management information to status response messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 200 is performed by a machine of distributed computing system 100 of FIG. 1.

Referring to FIG. 2, method 200 includes receiving a status inquiry message at a first machine (block 205). The status inquiry message may be received by a status agent that is included in the first machine. The status inquiry message may have been generated at a second machine.

At block 210, processing logic determines whether the status inquiry message includes unsolicited management information. When an operating system (or status agent) generates a status inquiry message, the operating system may add unsolicited management information pertaining to a machine on which the operating system operates, and/or services and applications that operate on the machine. In one embodiment, the status inquiry message consumes a same amount of bandwidth with the attached management information as it would have if it had been transmitted without the management information. If the status inquiry message includes unsolicited management information, the method continues to block 215. If the status inquiry message does not include unsolicited management information, the method proceeds to block 225.

At block 215, the unsolicited management information is cached. The management information may be cached, for example, in a data store, or in a temporary volatile memory. At block 220, the unsolicited management information is forwarded to a management application. The unsolicited management information may be forwarded to the management application prior to intercepting a request from the management application for the management information.

Alternatively, the unsolicited management information may be provided to the management application upon intercepting a management message that requests the management information. In either case, the management information can be immediately available when the management application needs it.

At block 225, a status response message is generated. The status response message may be generated by a status agent that is included in the first machine. At block 230, management information is attached to the status response message. The management information may include operating statistics that that pertain to the first machine and/or applications and services that operate on the first machine. At block 235, the status response message is transmitted to a second machine from which the status inquiry message originated. The method then ends.

Figure 3:
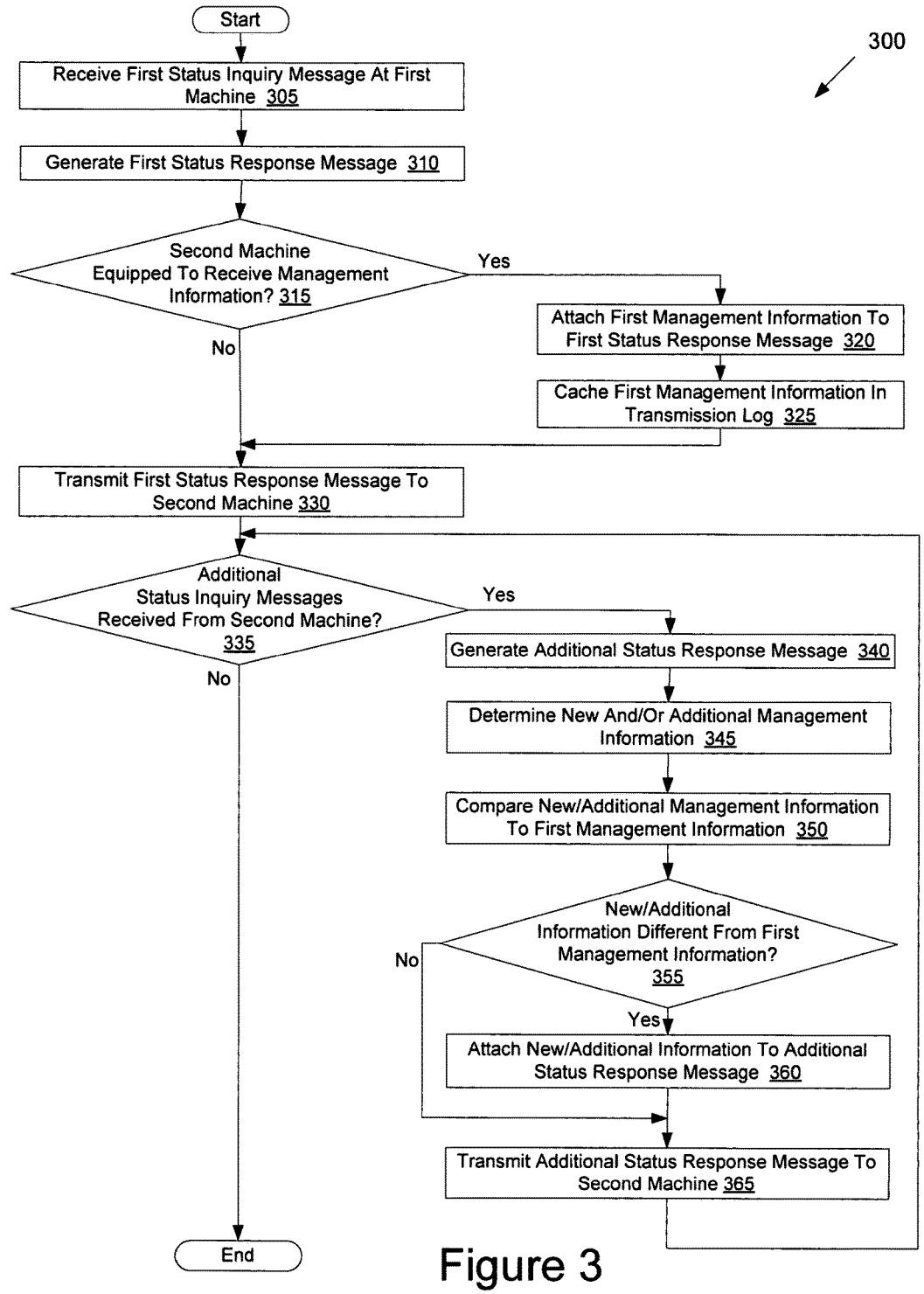
FIG. 3 illustrates a flow diagram of another embodiment for a method of attaching management information to status response messages in a distributed computing system.

FIG. 3 illustrates a flow diagram of another embodiment for a method 300 of attaching management information to status response messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine of distributed computing system 100 of FIG. 1.

Referring to FIG. 3, method 300 includes receiving a first status inquiry message at a first machine (block 305). At block 310, a status response message is generated. At block 315, processing logic determines whether a second machine from which the status inquiry message originated is equipped to receive management information via status response messages. Such a determination may be made by examining a table that identifies for each machine in a distributed computing system whether or not the machine is equipped to receive management information via status inquiry and/or status response messages. Alternatively, such a determination may be made by examining the status inquiry message. Status inquiry messages may include a tag that identifies whether they were generated by a machine that can receive management information via status response messages. Moreover, if the status inquiry message includes unsolicited management information, this identifies the machine that generated the status inquiry message as equipped to receive management information. If the second machine is equipped to receive management information via status response messages, the method proceeds to block 320. Otherwise the method proceeds to block 330.

At block 320, first management information is attached to the first status response message. First management information includes operating statistics that pertain to the first machine and/or applications and services that operate on the first machine. At block 325, first management information is cached in a transmission log. The transmission log identifies what management information is sent to remote machines. At block 330, the first status response message is transmitted to a second machine from which the status inquiry message originated.

At block 335, processing logic determines whether any additional status inquiry messages are received from the second machine. If no additional status inquiry messages are received, the method ends. If additional status inquiry messages are received from the second machine, the method proceeds to block 340.

At block 340, an additional status response message is generated. At block 345, processing logic determines new and/or additional management information to attach to the additional status response message. Additional management information may include management information that was not sent in the initial status response message. For example, first machine may have failed to attach management information pertaining to one or more services that operate on the first machine in the initial status response message. New management information may include updates to management information that was included in the initial status response message. For example, if a state of a first service included in the first machine has changed, this data may be included in the new management information.

At block 350, the new and/or additional management information is compared to first management information (e.g., by examining the transmission log). At block 355, processing logic determines whether the new/additional management information is different from the first management information. If the new/additional management information is not different from first management information, the method proceeds to block 365. If the new/additional management information is different from first management information, the method continues to block 360.

At block 360, the new/additional management information is attached to the additional status response message. At block 365, the additional status response message is transmitted to the second machine. The method then proceeds to block 335.

Method 300 may continue indefinitely so long as status inquiry messages continue to be received from second machine. In one embodiment, if no additional status inquiry messages are received in a specified time period, processing logic times out, and the method is terminated.

Figure 4:
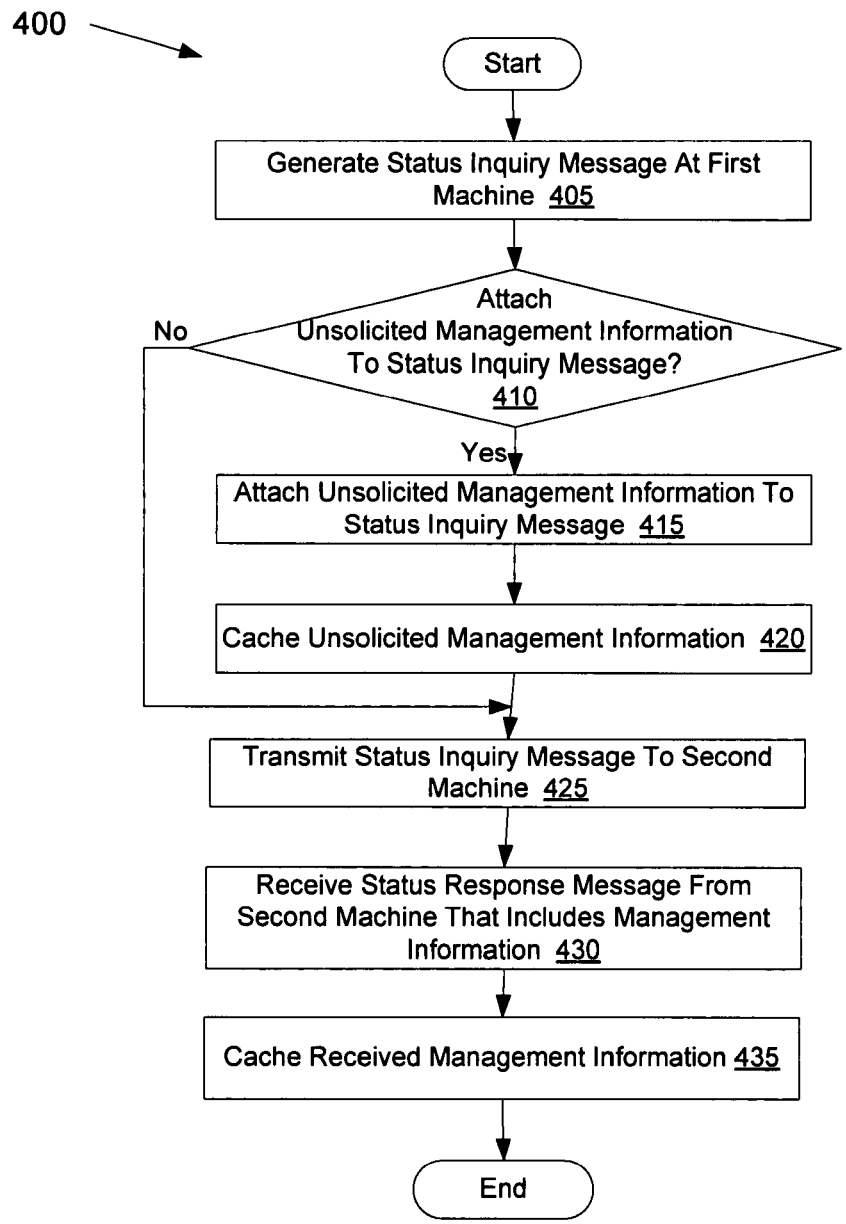
FIG. 4 illustrates a flow diagram of one embodiment for a method of receiving management information via status response messages in a distributed computing system.

FIG. 4 illustrates a flow diagram of one embodiment for a method 400 of receiving management information via status response messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine of distributed computing system 100 of FIG. 1.

Referring to FIG. 4, method 400 includes generating a status inquiry message at a first machine (block 405). The status inquiry message may be generated by an operating system or status agent that runs on the first machine. The status inquiry message may be directed to a second machine, or to a service that operates on the second machine.

At block 410, processing logic determines whether to attach unsolicited management information to the status inquiry message. In one embodiment, management information is attached to the status inquiry message if a recipient of the status inquiry message is equipped to receive management information via status inquiry messages. If the processing logic is to attach management information to the status inquiry message, the method proceeds to block 415. Otherwise, the method proceeds to block 425.

At block 415, the unsolicited management information is attached to the status inquiry message. At block 420, the unsolicited management information is cached in a transmission log. At block 425, the status inquiry message is transmitted to a second machine.

At block 430, a status response message is received from the second machine. The status response message may include management information. At block 435, the received management information is cached (e.g., in a data store). The received management information may also be forwarded to a management application that is included in the first machine. The method then ends.

Figure 5:
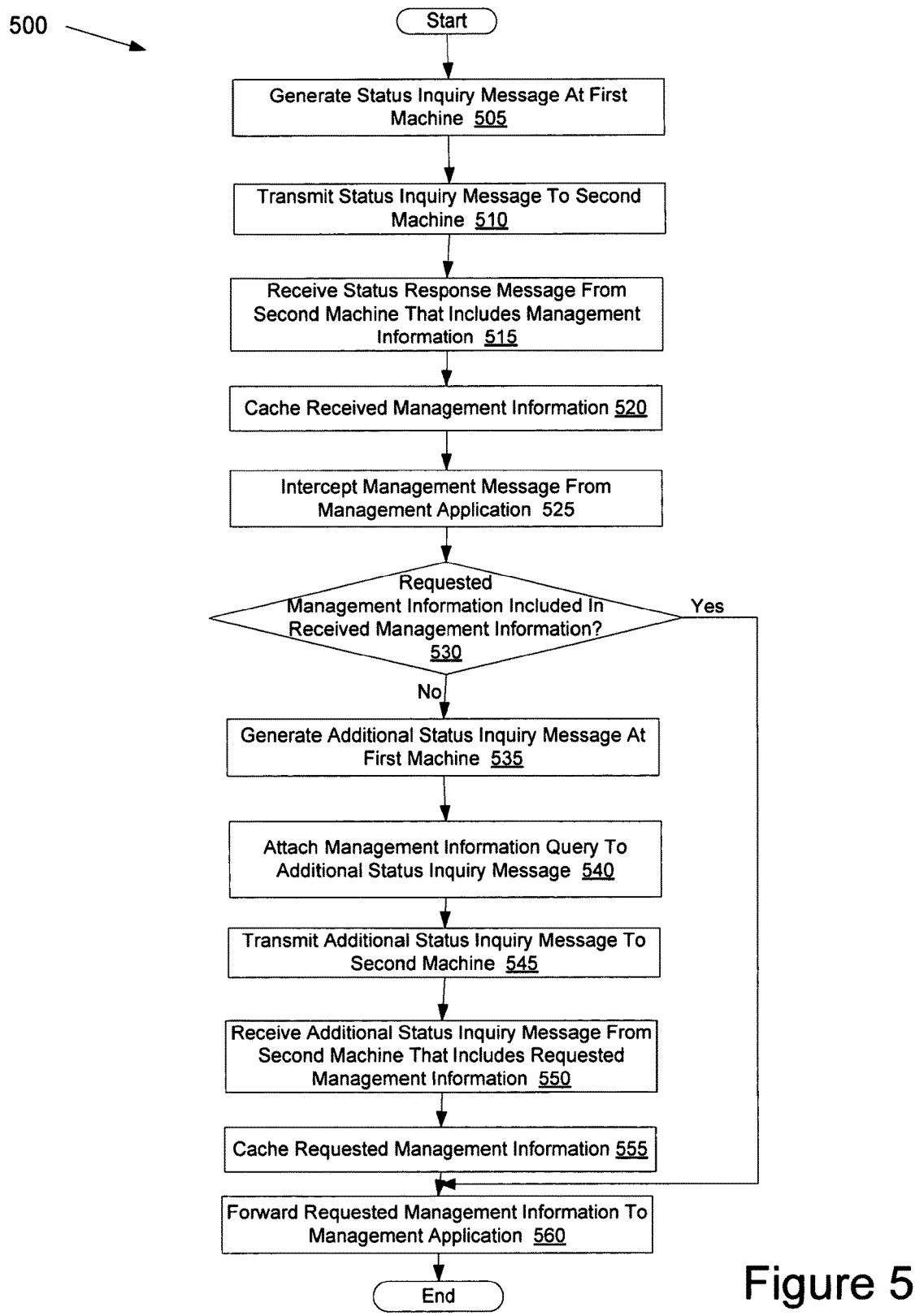
FIG. 5 illustrates a flow diagram of another embodiment for a method of receiving management information via status response messages in a distributed computing system.

FIG. 5 illustrates a flow diagram of another embodiment for a method 500 of receiving management information via status response messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 500 is performed by a machine of distributed computing system 100 of FIG. 1.

Referring to FIG. 5, method 500 includes generating a status inquiry message at a first machine (block 405). The status inquiry message may be generated by an operating system or status agent that runs on the first machine. The status inquiry message may be directed to a second machine, or to a service that operates on the second machine. At block 510, the status inquiry message is transmitted to a second machine. At block 515, a status response message is received from the second machine that includes management information. At block 520, the received management information is cached (e.g., in a data store).

At block 525, a management message is intercepted from a management application. The intercepted management message may include a request for management information. At block 530, processing logic determines whether the requested management information is included in the received management information. For example, the received management information may include operating statistics on a first service and a second service. If the request is for operating statistics on the first service, then the requested management information would be included in the received management information. If the request is for operating statistics of a third service, then the requested management information is not included in the received management information. If the requested management information is included in the received management information, the method proceeds to block 560. If the requested management information is not included in the received management information, the method continues to block 535.

At block 535, an additional status inquiry message is generated at the first machine. At block 540, a management information query is attached to the additional status inquiry message. The management information query identifies the requested management information. At block 545, the additional status inquiry message is transmitted to the second machine.

At block 550, an additional status response message is received that includes the requested management information. At block 555, the requested management information is cached. At block 560, the requested management information is forwarded to the management application. The method then ends.

Figure 6:
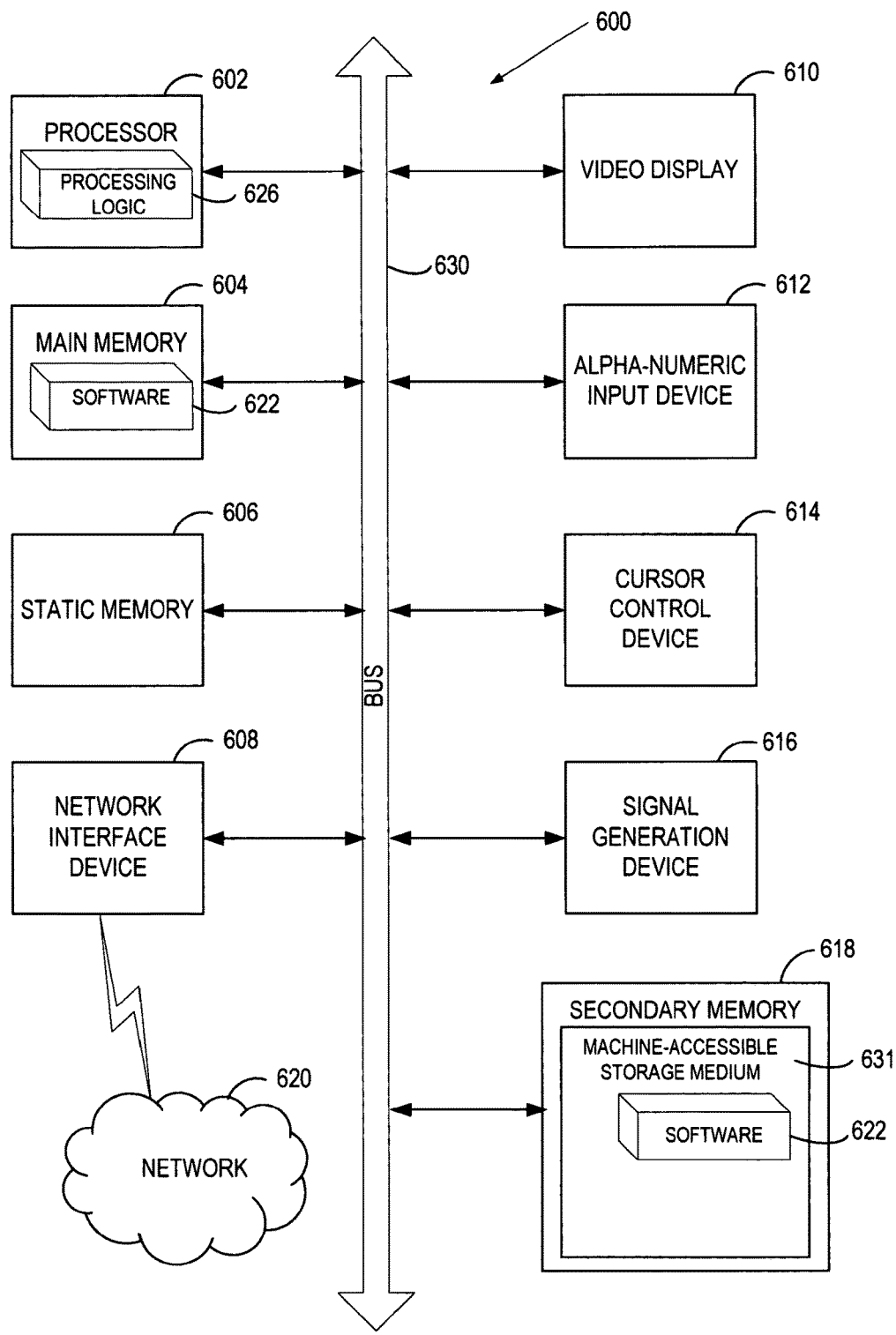
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store the first intermediary 145, first status agent 148 and/or first management application 130 of FIG. 1, and/or a software library containing methods that call the first intermediary 145, first status agent 148 and/or first management application 130. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    generating a status inquiry message by a processor of a first machine, wherein the status inquiry message requests an operational status of one of a second machine or a service operating on the second machine;
    transmitting the status inquiry message to the second machine;
    receiving one or more status response messages, the one or more status response messages comprising first management information and additional management information of the second machine, wherein the additional management information pertains to an unrequested operational status of the second machine or the service operating on the second machine;
    caching, by the processor, the first management information and the additional management information;
    intercepting, by the processor, a management message from a management application of the first machine, the management message requesting second management information of the second machine;
    determining, by the processor in view of the additional management information, whether cached management information comprises the requested second management information of the second machine; and
    forwarding the cached management information to the management application of the first machine in response to the cached management information comprising the requested second management information.

2. The method of claim 1, wherein in response to the cached management information not comprising the requested second management information, the method further comprising:
    generating a second status inquiry message;
    attaching the request for the second management information of the second machine to the second status inquiry message;
    sending the second status inquiry message to the second machine;
    receiving a second status response message, the second status response message comprising the second management information of the second machine;
    caching the second management information of the second machine; and
    forwarding the second management information of the second machine to the management application of the first machine.

3. The method of claim 1, wherein generating the status inquiry message comprises generating the status inquiry message at an operating system on the first machine, wherein the status inquiry message is an internet control message protocol (ICMP) message.

4. The method of claim 1, wherein the first management information comprises operating statistics of at least one of the second machine, the service, or an additional service that operates on the second machine.

5. The method of claim 1, wherein caching, by the processor, the first management information and the additional management information comprises recording a transmission log, and wherein determining whether the cached management information contains comprises the requested second management information further comprises:
    determining whether the cached management information has changed since a last transmission;
    generating a second status inquiry message;
    attaching a request for the changed second management information to the second status inquiry message;
    sending the second status inquiry message to the second machine;
    receiving a second status response message, the second status response message comprising the changed second management information of the second machine;
    caching the changed second management information of the second machine; and
    forwarding the second management information of the second machine to the management application.

6. A system, comprising:
    a first machine comprising a processor operatively coupled to a memory;
    a status agent executed by the processor, operatively coupled with the first machine to generate a status inquiry message, wherein the status inquiry message requests an operational status of one of a second machine or a service operating on the second machine, to transmit the status inquiry message to the second machine, and to receive one or more status response messages, the one or more status response messages comprising first management information and additional management information of the second machine, the first management information comprises operating statistics of at least one of the second machine, the service, or an additional service that operates on the second machine, wherein the additional management information pertains to an unrequested operational status of the second machine or the service operating on the second machine;
    an intermediary, executed by the processor, operatively coupled with the status agent, to cache the first management information and the additional management information, and to forward the first management information to a management application; and
    the intermediary to intercept a management message from the management application of the first machine, the management message requesting second management information from the second machine, to determine, by the processor in view of the additional management information, whether cached management information comprises the requested second management information of the second machine, and to forward the cached management information to the management application of the first machine in response to the cached management information comprising the requested second management information.

7. The system of claim 6, wherein the status agent to generate a second status inquiry message, to send the second status inquiry message to the second machine, and to receive a second status response message from the second machine, the second status response message comprising the second management information of the second machine; and in response to the cached management information not comprising the requested second management information of the second machine, the intermediary to attach the request for the second management information of the second machine to the second status inquiry message, to cache the second management information of the second machine upon receipt of the second status response message, and to forward the second management information of the second machine to the management application of the first machine.

8. The system of claim 6, wherein the status agent generating the status inquiry message comprises generating the status inquiry message at an operating system on the first machine, wherein the status inquiry message is an internet control message protocol (ICMP) message.

9. The system of claim 6, wherein the intermediary to record a transmission log of the cached management information; further determine whether the cached management information comprising the requested second management information of the second machine has changed in view of the transmission log;

wherein the status agent to generate a second status inquiry message, to send the second status inquiry message to the second machine, and to receive a second status response message from the second machine, the second status response message comprising changed second management information of the second machine; and in response to the cached management information comprising the requested second management information of the second machine has changed, the intermediary to attach a request for the changed second management information of the second machine to the second status inquiry message, to cache the changed second management information of the second machine upon receipt of the second status response message from the second machine, and to forward the second management information of the second machine to the management application of the first machine.

10. A non-transitory computer readable storage medium comprising instructions that, when executed by a processor, cause the processor to:

generate a status inquiry message at a first machine, wherein the status inquiry message requests an operational status of one of a second machine or a service operating on the second machine;

transmit the status inquiry message via a network;

receive one or more status response messages, the one or more status response messages comprising first management information and additional management information of the second machine, wherein the additional management information pertains to an unrequested operational status of the second machine or the service operating on the second machine;

cache, by the processor, the first management information and additional management information;

intercept a management message from a management application of the first machine, the management message requesting second management information of the second machine;

determine, in view of the additional management information, whether the cached management information comprises the requested second management information; and forward the cached management information to the management application of the first machine in response to the cached management information comprising the requested second management information.

11. The non-transitory computer readable storage medium of claim 10 wherein the processor is further to:

generate a second status inquiry message;

attach the request for the second management information of the second machine to the second status inquiry message;

send the second status inquiry message to the second machine;

receive a second status response message, the second status response message comprising the second management information of the second machine;

cache the second management information of the second machine; and forward the second management information of the second machine to the management application of the first machine.

12. The non-transitory computer readable storage medium of claim 10, wherein to generate the status inquiry message, the processor is to generate the status inquiry message at an operating system on the first machine, wherein the status inquiry message is an internet control message protocol (ICMP) message.

13. The non-transitory computer readable storage medium of claim 10, wherein the first management information comprises operating statistics of at least one of the second machine, the service, or an additional service that operates on the second machine.

14. The non-transitory computer readable storage medium of claim 10, wherein to cache, by the processor, the first management information and the additional management information comprises to record a transmission log, and wherein to determine whether the cached management information comprises the requested second management information further comprises:

determine whether the cached management information has changed since a last transmission;

generate a second status inquiry message;

attach a request for the changed second management information of the second machine to the second status inquiry message;

send the second status inquiry message to the second machine;

receive a second status response message from the second machine, the second status response message comprising the changed second management information of the second machine;

cache the changed second management information of the second machine; and forward the second management information of the second machine to the management application of the first machine.

\* \* \* \* \*

UNITED STATES PATENT AND TRADEMARK OFFICE
CERTIFICATE OF CORRECTION

PATENT NO. : 9,866,455 B2
APPLICATION NO. : 14/477784
DATED : January 9, 2018
INVENTOR(S) : Mark Cameron Little Page 1 of 1

It is certified that error appears in the above-identified patent and that said Letters Patent is hereby corrected as shown below:

In the Claims

In Claim 5, Column 14, Line 22, delete "contains"

Signed and Sealed this
Thirteenth Day of March, 2018

Andrei Iancu
*Director of the United States Patent and Trademark Office*